(12) United States Patent
Jobs et al.

(10) Patent No.: US 6,526,464 B1
(45) Date of Patent: Feb. 25, 2003

(54) MECHANISM TO EXPAND ADDRESS SPACE OF A SERIAL BUS

(75) Inventors: Jeffrey R. Jobs, Blaine, MN (US); Paul J. Voit, Coon Rapids, MN (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/349,422

(22) Filed: Jul. 7, 1999

(51) Int. Cl.[7] .............................................. G06F 13/00
(52) U.S. Cl. ....................................................... 710/300
(58) Field of Search ........................... 710/100, 38, 46, 710/8, 10, 300, 305, 306; 713/1, 100, 300

(56) References Cited

U.S. PATENT DOCUMENTS

| | | | | | |
|---|---|---|---|---|---|
| 5,581,541 A | * | 12/1996 | Whetsel | ...................... | 370/241 |
| 5,742,847 A | * | 4/1998 | Knoll et al. | ................... | 710/46 |
| 5,875,353 A | * | 2/1999 | Whetsel | ........................ | 710/38 |
| 6,161,157 A | * | 12/2000 | Tripathi et al. | ............. | 710/109 |
| 6,205,502 B1 | * | 3/2001 | Endo et al. | .................. | 710/100 |

* cited by examiner

*Primary Examiner*—Peter Wong
*Assistant Examiner*—X. Chung-Trans
(74) *Attorney, Agent, or Firm*—Leffert Jay & Polglaze, PA

(57) ABSTRACT

A computer system having a primary serial bus and one or more serial sub-busses separated from the primary serial bus by gating devices is described. By selectively enabling different gating devices (thereby coupling one serial sub-bus to the primary serial bus at a time), each sub-bus may support the maximum number of addressable devices. This, in turn, expands the effective serial bus address space of the computer system.

29 Claims, 4 Drawing Sheets

MECHANISM TO EXPAND ADDRESS SPACE OF A SERIAL BUS

BACKGROUND

The invention relates generally to serial bus operations within a computer system and more particularly, but not by way of limitation, to a mechanism to expand the number of devices that may be addressed on a serial bus.

Referring to FIG. 1, many current computer systems 100 incorporate serial communication bus 102 to facilitate system initialization, system administration, and power management operations. For example, serial bus controller 104 may use serial bus 102 to communicate with processor 106, second level cache memory 108, system memory 110, input-output (I/O) controller 112, power management devices 114 (e.g., clock generation circuitry and/or thermal control components such as fan units), and other system devices 116. As indicated, system components may also communicate via system bus 118. Illustrative serial busses include the Inter-Integrated Circuit ($I^2C$) bus sponsored by Phillips Semiconductor and the System Management Bus (SMBus) sponsored by Intel Corporation.

One use of serial bus 102 is to retrieve device configuration data from, for example, processor and system memory electrically erasable programmable read only memory (EEPROM) during system startup and/or reset operations. Another use of serial bus 102 is to monitor and control power management devices (e.g., component 114). For example, thermal sensors may communicate with a thermal monitoring routine (executed by processor 106 or, perhaps, a separate microcontroller included within device 114 or 116) which, in turn, control clock generation and/or fan circuitry.

The address space of serial bus 102 (i.e., the range of possible addresses) is generally limited both by definition and by practice. For example, current embodiments of the $I^2C$ and SMBus use a 7-bit address field which, when reserved addresses are accounted for, provide less than 100 possible addresses. Further limiting serial bus address space is the practice of many device manufacturers to preset one or more of their configuration EEPROM address lines to fixed values (e.g., configuration EEPROM associated with processor 106, second level cache 108, or system memory 110). In combination, and as a result, system designers are often limited to 8, or fewer, devices of the same type on serial bus 102. Thus, it would be beneficial to provide a mechanism to expand the number of devices that may be addressed by a serial bus.

SUMMARY

In one embodiment the invention provides computer system having a serial bus controller coupled to a primary serial bus, connector means adapted to receive at least one device having a serial bus interface, and a gating device coupled to the primary serial bus and the serial bus interface of the at least one device, the gating device having a control input, the gating device adapted to selectively couple and uncouple the at least one device to the primary serial bus in accordance with the control input. By selectively enabling different gating devices, the effective serial bus address space of the computer system may be expanded indefinitely.

In another embodiment the invention provides a method to selectively couple and uncouple a device to a primary serial bus. The method includes determining if a serial sub-bus exists and, if it does, selectively coupling the serial sub-bus to the primary serial bus, accessing a device coupled to the serial sub-bus, and deselecting the serial sub-bus to uncouple the serial sub-bus from the primary serial bus. Methods in accordance with the invention may be stored in any media that is readable and executable by a programmable control device.

DETAILED DESCRIPTION

Techniques (including methods and devices) to provide an expanded serial bus address space are described. The following embodiments of the invention are illustrative only and are not to be considered limiting in any respect.

Figure 1:
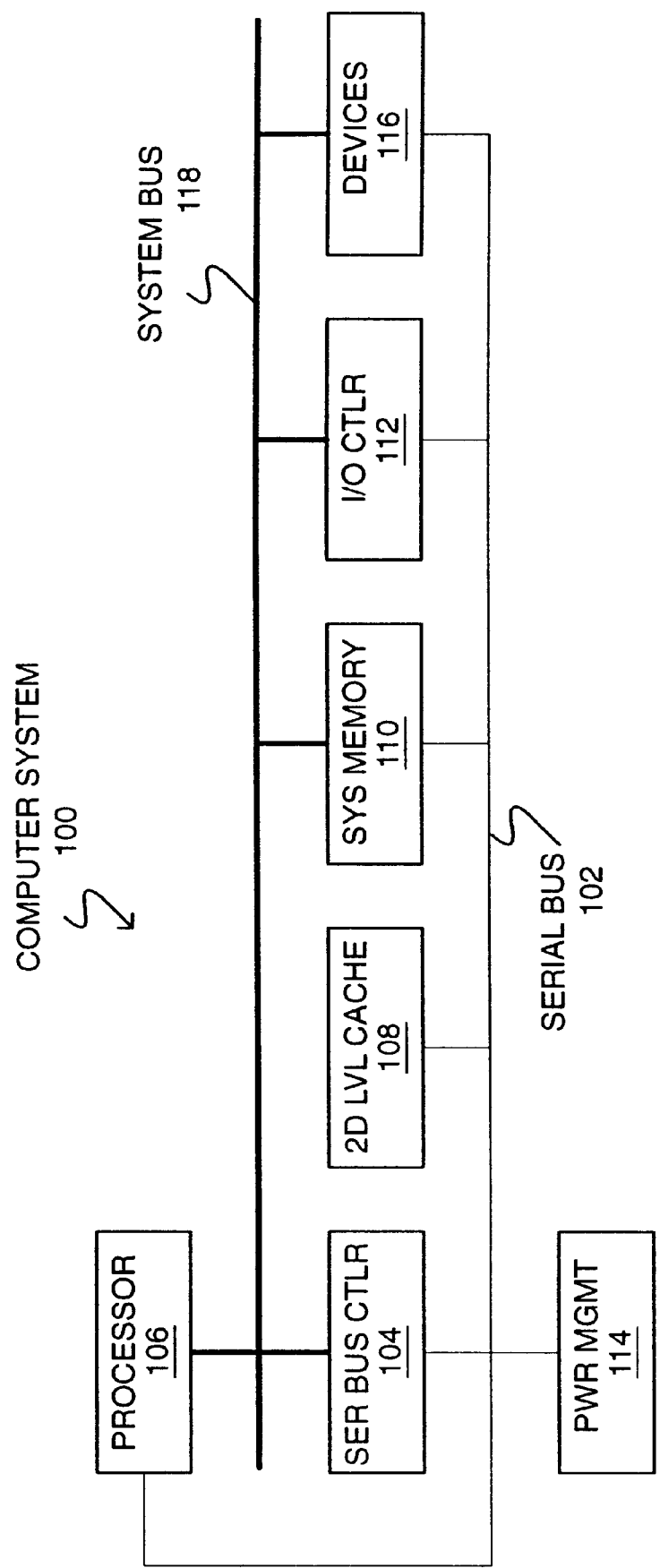
FIG. 1 shows a prior art computer system having a serial bus.
Figure 2:
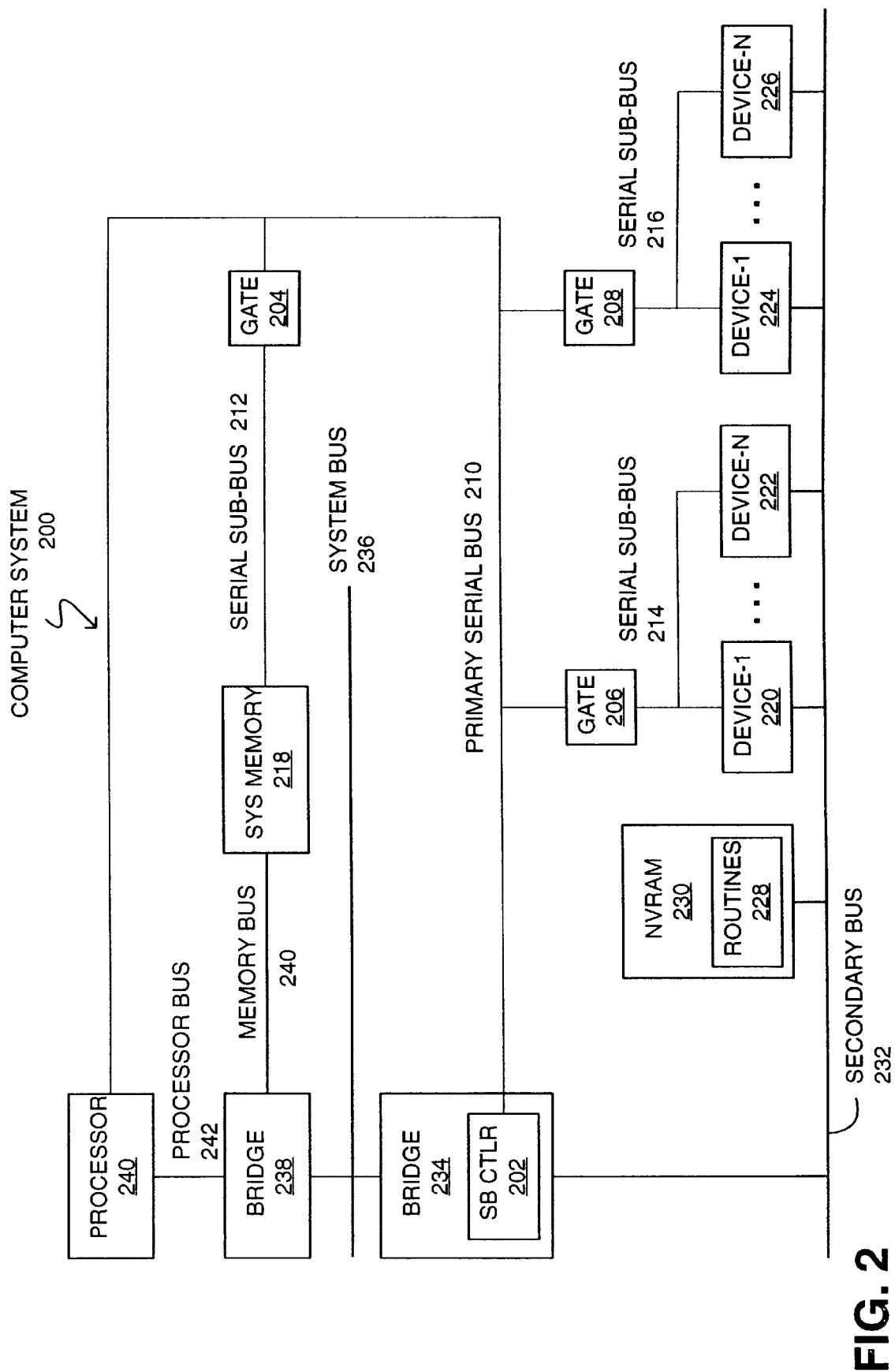
FIG. 2 shows a computer system in accordance with one embodiment of the invention.

Referring to FIG. 2, illustrative computer system 200 uses serial bus controller 202 and gating devices 204, 206 and 208 to partition primary serial bus 210 into sub-busses 212, 214 and 216. When gating device 204 is enabled, serial sub-bus 212 is coupled to primary serial bus 210 allowing access to those components of system memory 218 having a serial bus interface (see discussion below). When gating device 206 is enabled, serial sub-bus 214 is coupled to primary serial bus 210 allowing serial bus access to devices 220 through 222. When gating device 208 is enabled, serial sub-bus 216 is coupled to primary serial bus 210 allowing serial bus access to devices 224 through 226. By selectively enabling one gating device at a time, each serial sub-bus may support the maximum number of addressable devices. That is, serial sub-bus 212, serial sub-bus 214 and serial sub-bus 216 may each support devices having identical addresses; there will be no conflict if only a single sub-bus is enabled at a time. Thus, the effective serial bus address space of a computer system in accordance with the invention may be expanded indefinitely.

In one embodiment, basic input-output routines 228 selectively enable gating devices (e.g., 204, 206 and 208) during power-on self-test (POST) operations to allow the retrieval and/or setting of device configuration data. For example, POST routines 228 may selectively enable gating device 204 (disabling gating devices 206 and 208) to allow access to system memory configuration data (typically stored in one or more electrically erasable programmable read only memory elements incorporated within system memory 218). Similarly, POST routines 228 may selectively enable gating device 206 (disabling gating devices 204 and 208) to allow access to secondary bus devices 220 through 222, and gating device 208 (disabling gating devices 204 and 206) to allow access to secondary bus devices 224 through 226. While many bus-compatible switches are available, one illustrative gating device (e.g., gate 204) is the SN74CBT1G125 single FET (Field Effect Transistor) bus switch available from Texas Instruments Corporation.

As shown, POST routines 228 are often stored in non-volatile random access memory device 230 coupled to secondary bus 232. Secondary bus 232, in turn, may be coupled by bridge circuit 234 to system bus 236, and by bridge circuit 238 to processor unit 240. Illustrative non-volatile memory devices (e.g., NVRAM 230) include read only memory (ROM), electrically programmable read only memory (EPROM), electrically erasable programmable read only memory (EEPROM), flash memory, and complementary metal oxide semiconductor (CMOS) memory. Illustrative secondary buses (e.g., bus 232) include those busses conforming to the Low Pin Count (LPC) interface, Industry Standard Architecture (ISA) and Extended Industry Standard Architecture (EISA) specifications. An illustrative secondary bus bridge circuit (e.g., bridge circuit 234) is the PIIX4 PCI-to-ISA/IDE accelerator chip from Intel Corporation. An illustrative system bus bridge circuit (e.g., bridge circuit 238) is the 440BX AGPset device from Intel Corporation. An illustrative system bus (e.g., bus 236) conforms to the Peripheral Component Interconnect (PCI) specification, and an illustrative processor unit (e.g., 240) is the PENTIUM® processor from Intel Corporation (the PENTIUM® processor includes non-volatile memory accessible via a serial bus interface).

Figure 4:
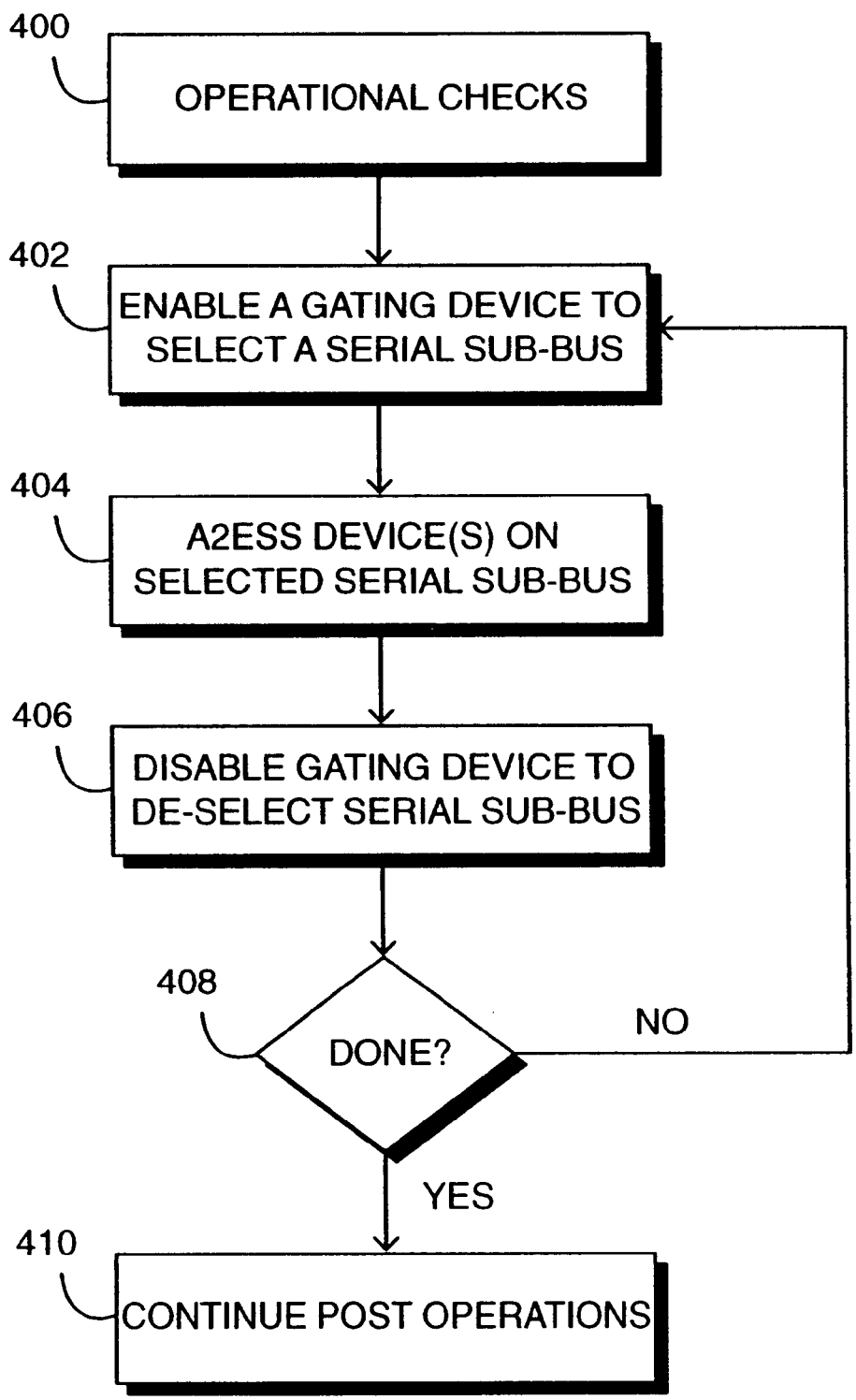
FIG. 4 shows a basic input-output system power-on self-test operation in accordance with one embodiment of the invention.

Configuration data memory (e.g., EEPROM associated with system memory 218, devices 220 through 226, and processor unit 240) may be inspected during computer system POST operations as illustrated in FIG. 4. On computer system startup/reset, a series of system checks may be performed to verify various components of computer system 200 are functioning properly (block 400). A first gating device is then enabled and its associated sub-bus is coupled to primary serial bus 210 (block 402). Configuration data associated with the device(s) coupled to the sub-bus may then be accessed (block 404). For example, BIOS routines 228 may query individual memory devices to determine the amount (e.g., the number of bytes) and structure (e.g., number of banks) of system memory 218. Once access to the selected sub-bus is complete, the sub-busses gating device is disabled (block 406) and a check is made to determine if another serial sub-bus exists that has not yet been accessed (diamond 408). If a serial sub-bus exists that has not yet been accessed (the "no" prong of diamond 408), the acts of blocks 402 through 406 are repeated for that sub-bus. If all serial sub-busses have been accessed (the "yes" prong of diamond 408), POST processing continues (block 410).

In another embodiment, a software routine accessible during normal system operations may be executed to selectively enable different gating devices. Such a control routine may be stored in system memory 218 or as an interrupt service routine in, for example, NVRAM device 230. In this embodiment, BIOS routines 228 may store serial bus configuration information (e.g., what gating devices control access to which serial sub-bus, what devices are coupled to each serial sub-bus, and the address for each device coupled to a serial sub-bus) in a memory (e.g., bridge circuit 234 configuration space memory or designated locations in system memory 218) during start-up or POST processing. This information may be used by the run-time executed software routine to control the different gating devices.

Figure 3:
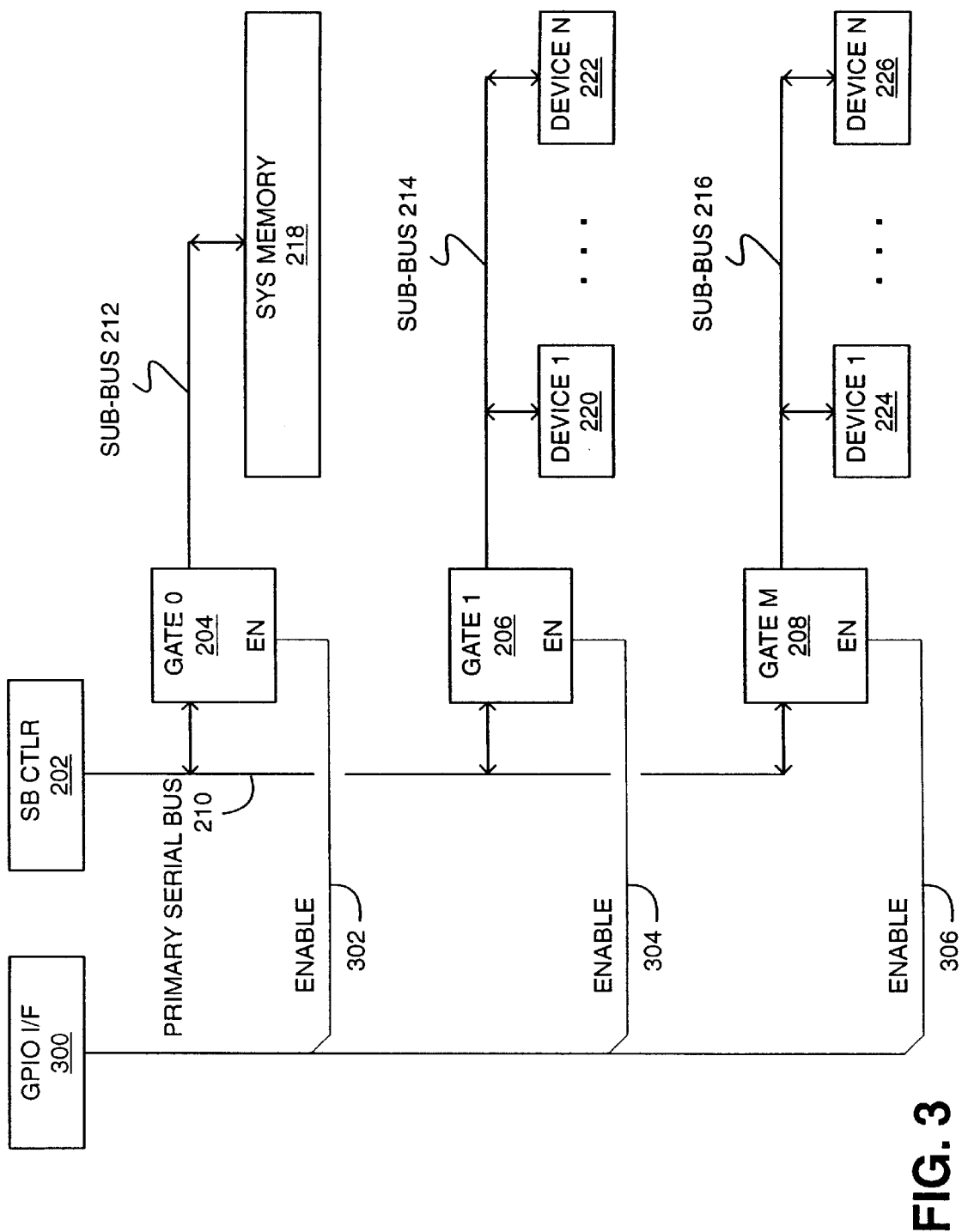
FIG. 3 shows an expanded view of the serial bus structure of FIG. 2.

An expanded view of primary serial bus 210, serial sub-busses 212, 214 and 216, and serial bus controller 202 is shown in FIG. 3. Under control of BIOS (at startup) or a run-time executed software routine, individual gating devices may be selectively enabled to couple their respective sub-bus to primary serial bus 210. In one embodiment, general purpose input-output (GPIO) interface 300 is used to selectively enable gating devices. That is, GPIO output 302, 304 and 306 is coupled to the enable control input of gating devices 204, 206 and 208. This embodiment may be particularly useful as many secondary bus bridge circuits (i.e., bridge circuit 234) provide a GPIO interface. In another embodiment, serial bus controller 202 may itself generate gating device enable signals.

It will be understood that system memory 218 and devices 220 through 226 may be physically coupled to computer system 200 through various connectors and/or sockets. For example, system memory 218 may be coupled to memory bus 242 and serial sub-bus 212 via a dual in-line memory module (DIMM) connector. Similarly, processor unit 240 may be coupled to processor bus 242 and primary serial bus 210 through a standard processor socket. Further, devices 220 through 226 may be coupled to secondary bus 232 (and/or system bus 236, not shown in FIG. 2) and serial sub-busses 214 and 216 via any appropriate receptacle such as Personal Computer Memory Card International Association (PCMCIA) connectors, and/or PCI add-in card connectors, and/or ISA add-in card connectors, and/or EISA add-in card connectors.

Various changes in the materials, components, circuit elements as well as in the details of the illustrated operational method are possible without departing from the scope of the claims. For instance, the illustrative system of FIG. 2 may include fewer or more serial sub-busses. In addition, devices having serial bus interfaces (e.g., a microcontroller or system monitoring device) may be coupled to system bus 236, secondary bus 232, or directly to primary serial bus 236 or a sub-bus thereof without being coupled to either system or secondary busses 236 and 232 respectively. Further, routines 228 may be accessible through one or more system management interrupt calls and/or system control interrupt calls.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A computer system comprising:
  a serial bus controller coupled to a primary serial bus;
  connector means adapted to receive at least one device having a serial bus interface;
  a gating device coupled to the primary serial bus and the serial bus interface of the at least one device, the gating device having a control input, the gating device adapted to selectively couple and uncouple the at least one device to the primary serial bus in accordance with a control input; and
  a non-volatile memory device coupled to the serial bus controller via a secondary bus, the non-volatile memory device stores basic input-output routines used by the serial bus controller to selectively activate the gating device via the control input.

2. The computer system of claim 1, further comprising a bridge circuit wherein the serial bus controller comprises one aspect of the bridge circuit.

3. The computer system of claim 1, wherein the control input of the gating device is coupled to the serial bus controller.

4. The computer system of claim 1, further comprising a general purpose input-output interface, the general purpose input-output interface coupled to the control input of the gating device.

5. The computer system of claim 4, further comprising a bridge circuit wherein the general purpose input-output interface is an aspect of the bridge circuit.

6. The computer system of claim 1, wherein the at least one device comprises a configuration data storage element, the configuration data storage element coupled to the serial interface of the at least one device.

7. The computer system of claims 6, wherein the configuration data storage element comprises an electrically erasable programmable read only memory device.

8. The computer system of claim 7, wherein the at least one device comprises a memory module.

9. The computer system of claim 7, wherein the at least one device comprises a processor unit.

10. The computer system of claim 7, wherein the at least one device comprises an add-in card device.

11. The computer system of claims 10, wherein the add-in card device comprises a peripheral component interface device.

12. The computer system of claim 10, wherein the add-in card device comprises a secondary bus device.

13. The computer system of claim 12, wherein the secondary bus a device comprises an industry standard architecture device.

14. The computer system of claim 1, further comprising a motherboard wherein the connector means comprises a socket connected to the motherboard.

15. The computer system of claim 1, further comprising a motherboard wherein the connector means comprises a direct connection between the at least one device and the motherboard.

16. The computer system of claim 1, further comprising a motherboard wherein the gating device is coupled directly to the motherboard.

17. A method to selectively couple and uncouple a device to a primary serial bus in a computer system, comprising:
 determining if a serial sub-bus exists by retrieving serial bus configuration data from a non-volatile memory and, if it does;
 selectively coupling the serial sub-bus to the primary serial bus;
 accessing a device coupled to the serial sub-bus; and
 deselecting the serial sub-bus to uncouple the serial sub-bus from the primary serial bus.

18. The method of claim 17, wherein the act of selectively coupling comprises enabling one of one or more serial sub-bus gating devices.

19. The method of claim 18, wherein the act of enabling comprises generating an enable control signal to the one of the one or more serial sub-bus gating devices.

20. The method of claim 18, wherein the act of deselecting comprises disabling the one of one or more serial sub-bus gating devices.

21. The method of claim 17, wherein the act of accessing comprises retrieving data from a storage element associated with the device.

22. The method of claim 21, further comprising storing data in the storage element associated with the device.

23. A non-volatile memory device, readable by a programmable control device, comprising:
 basic input-output instructions stored on the non-volatile memory device for causing the programmable control device to selectively couple and uncouple a device to a primary serial bus in a computer system, the basic input-output instructions including instructions to determine if a serial sub-bus exists and, if it does,
 selectively couple the serial sub-bus to the primary serial bus,
 access a device coupled to the serial sub-bus, and
 deselect the serial sub-bus to uncouple the serial sub-bus from the primary serial bus.

24. The non-volatile memory device of claim 23, wherein the instructions to determine comprise instructions to retrieve serial bus configuration data from a memory.

25. The non-volatile memory device of claim 23, wherein the instructions to selectively couple comprise instructions to enable one of one or more serial sub-bus gating devices.

26. The non-volatile memory device of claim 25, wherein the instructions to enable comprise instructions to generate an enable control signal to the one of the one or more serial sub-bus gating devices.

27. The non-volatile memory device of claim 25, wherein the instructions to deselect comprise instructions to disable the one of one or more serial sub-bus gating devices.

28. The non-volatile memory device of claim 23, wherein the instructions to access comprise instructions to retrieve data from a storage element associated with the device.

29. The non-volatile memory device of claim 28, further comprising instructions to store data in the storage element associated with the device.

* * * * *